Patented Apr. 28, 1925.

1,535,687

UNITED STATES PATENT OFFICE.

OTTO RUFF, OF BRESLAU, GERMANY.

PROCESS FOR REFINING ZIRCONIUM-CONTAINING ORES AND OTHER PRODUCTS CONTAINING DIOXIDE OF ZIRCONIUM.

No Drawing.   Application filed February 2, 1923.   Serial No. 616,615.

*To all whom it may concern:*

Be it known that I, Professor Dr. OTTO RUFF, citizen of the German Republic, residing at Uferzeile 10, Breslau 16, Germany, have invented a new and improved process for refining zirconium-containing ores and other products containing dioxide of zirconium, of which the following is a specification.

The refining of ores containing zirconium or other products containing zirconium dioxide associated with other and undesirable metallic compounds, especially oxide of iron, dioxide of titanium, dioxide of silicon, trioxide of boron, has been tried in many different ways, but no absolutely satisfactory results have been obtained, as the processes employed have been either too involved, or too expensive.

I have found that tetrachloride of zirconium, when heated together with oxides of iron, titanium, tin and certain other metals, forms the dioxide of zirconium and the chlorides of the other metals, and, similarly, that tetrafluoride of zirconium, when heated together with oxide of silicon, oxide of boron, and certain other similar oxides, forms corresponding fluorides. If, therefore, the crude ore of zirconium or the products containing dioxide of zirconium associated with the undesirable metals aforesaid, be admixed with quantitative amounts of tetrachloride of zirconium, or tetrafluoride of zirconium, according to the particular metal or metals to be removed, and the mixture calcined, the haloid salts of zirconium will react with the iron, titanium, tin, silicon and boron, and other like elements present, during the heating operation, forming chlorides or fluorides of the undesirable metals and dioxide of zirconium, the reaction being more thorough and complete if the materials are first ground to a pulverulent condition and the calcining be carried out slowly and uniformly at a temperature which will cause the resultant chlorides or fluorides to be volatilized or eliminated from the treated mass, thereby leaving a substantially pure zirconium dioxide as the residual metallic value.

In the practicing of the inveniton, it is found desirable to grind the crude ore, or other product containing zirconium, as fine as possible and to wash it before admixture with the haloid of zirconium aforesaid, and it is further advisable to avoid raising the temperature of the mixture beyond that necessary to effect the reactions between haloids of zirconium and the oxides of the metals to be removed, until after the reaction has been finished, but, on the contrary, to maintain the temperature at or below that at which the pressure of the vaporized haloids of the contaminating metals is substantially equal to that of the atmosphere. Under some circumstances, it has been found advantageous to carry out the heating or calcining in closed receptacles, so that a pressure somewhat above one atmosphere may be employed. If it is found necessary to remove only iron, tin, titanium, or similar metals, it will be best to use only tetrachloride of zirconium, or such additions as will form tetrachloride of zirconium. If, however, in addition to the metals mentioned, silicon or boron, or both are to be removed, then the ore or other product containing zirconium is treated either by simultaneous or successive operations with zirconium tetrachloride and zirconium tetrafluoride, under conditions of heat indicated.

Obviously, instead of adding the zirconium tetrachloride or zirconium tetrafluoride to the ore, these zirconium salts may be produced, during the reaction, from the zirconium of the ore. For example, to produce the tetrachloride, ammonium chloride is introduced during the heating operation. Instead of ammonium chloride, carbon tetrachloride may be passed through the mixture, which, in turn, may be substituted by chloride of sulphur together with free chlorine. In order to produce the tetrafluoride of zirconium, the heating of the ore may be effected in the presence of fluoride of ammonium, or by passing through the heated ore hydrogen fluoride.

Practical examples of the application of the new process are as follows:

*First example.*—Baddeleyite carrying approximately $7\frac{1}{2}\%$ of oxide of iron was ground to a state of extreme fineness, washed, dried and calcined in the presence of chlorine and tetrachloride of carbon passed through the mass, the calcination being carried out until chloride of iron fumes were no longer evolved. The resultant product was substantially pure dioxide of zirconium.

*Second example.*—Baddeleyite, which had been ground, washed and dried as before, was heated together with chloride of ammonium within a closed receptacle under conditions that caused the chloride of iron to be slowly sublimed out of the mass and deposited on the cooler parts of the receptacle, together with the unused portion of the ammonium chloride.

*Third example.*—An iron containing ore of zirconium, ground, washed and dried as before, was mixed with fluoride of ammonium and slowly calcined until the resultant fumes of fluoride of iron and tetrafluoride of silicon were no longer generated.

What I claim is:

1. The process of refining zirconium containing ores or products containing dioxide of zirconium, which comprises heating the same with a haloid salt of zirconium or with materials forming such haloid salt, at a temperature sufficient to vaporize the resultant haloid salts of the contaminating elements.

2. The process of refining zirconium containing ores or products containing dioxide of zirconium, which comprises grinding and washing the materials to be refined, and heating the same with a haloid salt of zirconium or with materials forming such haloid salt, at a temperature sufficient to vaporize the resultant haloid salts of the contaminating elements.

3. The process of refining zirconium containing ores or products containing dioxide of zirconium, which comprises heating the same with a haloid salt of zirconium or with materials forming such haloid salt at such temperature as will produce an appreciable pressure in the evolved vapors of the resultant haloid salts of the contaminating elements.

4. The process of refining zirconium containing ores or products containing dioxide of zirconium, which comprises heating the same with quantitative proportions of tetrachloride of zirconium or with materials forming the latter to a temperature at which the resultant haloid salts of iron, titanium and tin are vaporized.

5. The process of refining zirconium containing ores or products containing dioxide of zirconium, which comprises heating the same with quantitative proportions of tetrachlorine of zirconium and tetrafluoride of zirconium or with materials forming said compounds to a temperature at which the resultant haloid salts of iron, titanium, tin, silicon and boron are vaporized.

In testimony whereof affixed his signature in presence of two witnesses.

Dr. OTTO RUFF.

Witnesses:
  Oscar F. Brown,
  F. B. Herolf.